E. Z. CROW.
VEHICLE WHEEL.
APPLICATION FILED OCT. 24, 1912.
1,088,326.
Patented Feb. 24, 1914.
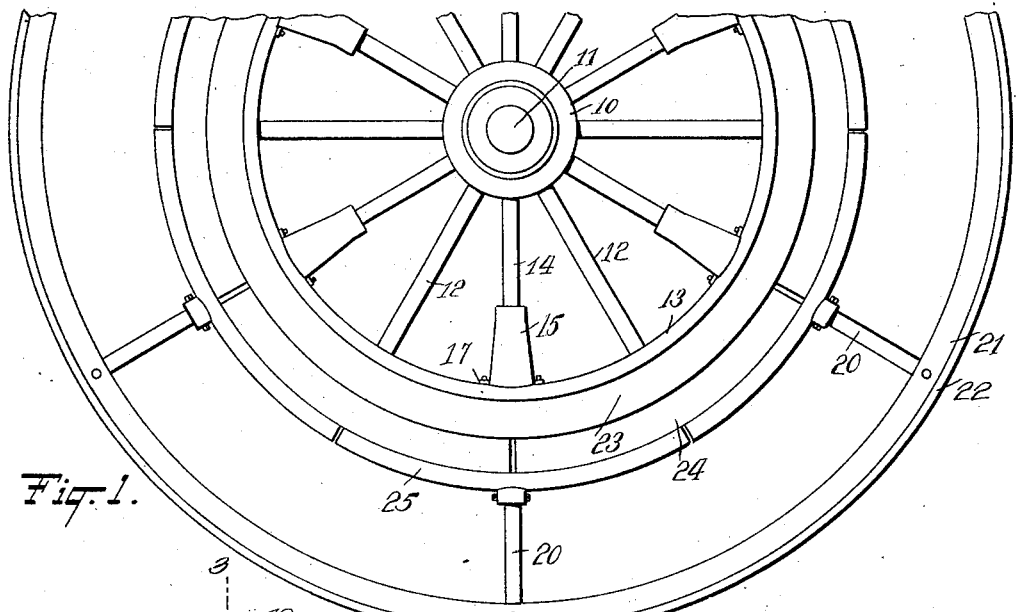
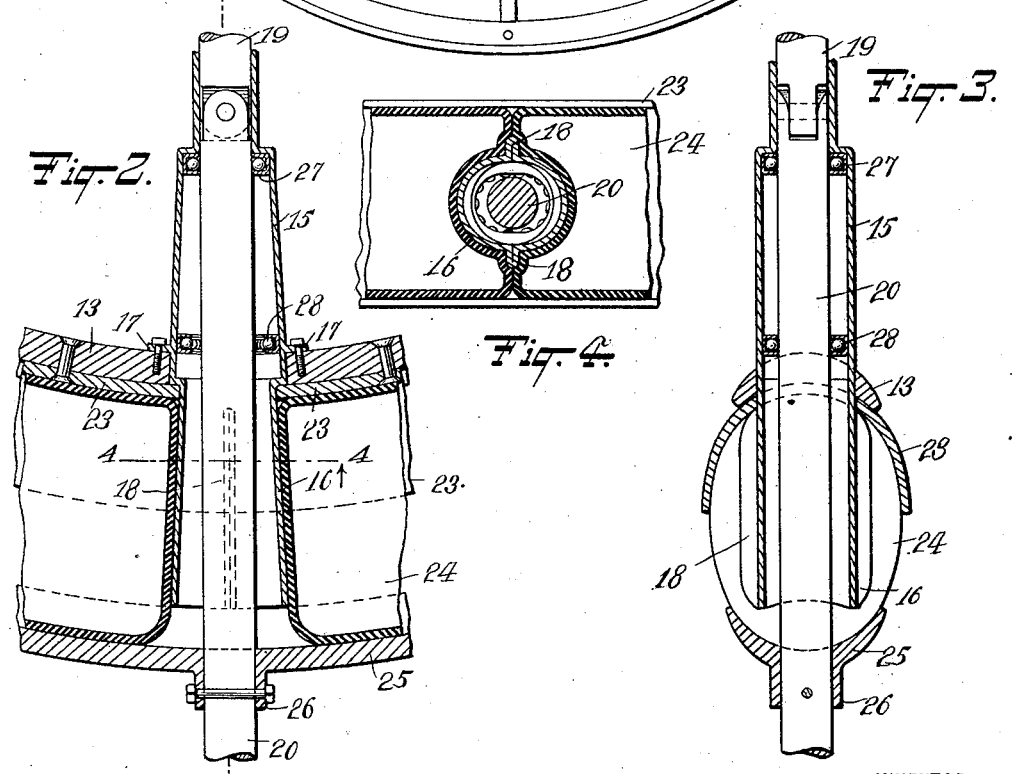
WITNESSES
INVENTOR
Elmer Z. Crow,
BY
ATTORNEYS

UNITED STATES PATENT OFFICE.

ELMER ZIMMERMAN CROW, OF BIRMINGHAM, ALABAMA.

VEHICLE-WHEEL.

1,088,326.  Specification of Letters Patent.  Patented Feb. 24, 1914.

Application filed October 24, 1912. Serial No. 727,525.

*To all whom it may concern:*

Be it known that I, ELMER Z. CROW, a citizen of the United States, and a resident of Birmingham, in the county of Jefferson and State of Alabama, have invented new and Improved Vehicle-Wheels, of which the following is a full, clear, and exact description.

This invention relates generally to vehicle wheels, and, more particularly, to one comprehending a plurality of independent resilient elements between the hub and the tire.

The principal object of my invention is to provide a wheel possessing the advantages of those with resilient tires and at the same time so positioning the resilient elements that the cost of tire maintenance will be materially reduced.

A further object is the provision of a vehicle wheel, resilient in character, the construction of which well adapts it to withstand heavy loads as well as the side thrusts to which wheels are subjected when in use. It is also of some importance in this art to offer an article which, in addition to its usefulness, will not be characterized by a grotesque appearance.

Reference is to be had to the accompanying drawings forming part of this specification, in which similar characters of reference denote corresponding parts in all the views, and in which—

Figure 1 is a partial side view of the wheel; Fig. 2 is a partial vertical sectional view thereof; Fig. 3 is a sectional view on the line 3—3 of Fig. 2; and Fig. 4 is a sectional view on the line 4—4 of Fig. 2.

Referring to the drawing, 10 is a hub of any suitable form having an opening 11 therethrough, in which the axle fits. A number of ordinary solid spokes 12 connect the hub 10 to an ordinary inner felly 13. A similar number of tubular inner spoke sections 14 is placed intermediate the spokes 12, connecting also the hub and the inner felly. The parts 15 and 16 of the inner tubular spoke portion are enlarged, for a purpose that will appear hereinafter. The part 15 is provided with flanges 17 by means of which the tubular spoke is attached to the inner felly with the part 15 directed toward the hub and the part 16 away from the same. The enlarged parts 15 and 16 of the tubular spoke are preferably formed integrally with it, and are elliptical in cross section. The part 16 of the tubular spoke is provided with ribs 18 preferably formed integrally with the part, and lying in a plane normal to the face of the wheel.

Telescoping in the inner tubular spoke portions is an outer spoke portion formed of two parts 19 and 20 hinged near the enlargement 15 formed in the inner tubular spoke portion 14. The part 20 projecting through the enlarged parts of the tubular spoke is pivotally connected to the outer ordinary felly 21, also provided with the customary rim 22. It may be said that the part 19 of the telescoping spoke is floating in the inner tubular spoke portion 14. The inner felly 13 is provided with a U-shaped rim 23 attached in any desired manner with the U-shape facing the outer felly 21. Due to the enlarged portion 16 of the tubular spoke projecting out of the inner felly 13 and the U-shaped rim 23, the U-shaped rim is divided into compartments, each receiving a resilient member, and preferably a pneumatic chamber 24, the pneumatic chambers being so shaped as to contact between them and fit around the projecting part 16 of the tubular spoke (see Fig. 4). The pneumatic chambers 24 at the side opposite the U-shaped rim 23 are encircled by a curved rim made in sections 25 forming abutting segments provided with collars 26 through which the outer spoke portion 20 of the telescopic spoke projects, and to which said part 20 is attached by means of a bolt, so that when the part 20 of the telescopic spoke moves, the sections 25 move with it. The sections 25 and pneumatic chambers 24 are staggered, so that one section contacts with portions of two chambers simultaneously.

When the wheel supports a load, the outer rim 22 contacts with the ground, and consequently the telescopic spokes and the sections 25 attached thereto are correspondingly forced in or out of the tubular spokes, and to or from the pneumatic cushions, that is, in the lower part of the wheel the spokes are forced in and in the upper part out; the same may be said for the sections 25 and the pneumatic cushions 24. Since the rim 22, the felly 21 and the outer spoke portion 20 of the telescopic spoke are connected, their displacement is a bodily one, and consequently the outer spoke portions 20 of the telescopic spokes, where not vertical, will not move radially, but vertically, and in consequence of that the outer portions of the telescopic spokes are made of two hinged parts, and the inner tubular spoke portions are enlarged at the end engaged by the outer spoke portion 20. To eliminate friction between the outer spoke portion 20 and the enlarged portion of the inner spoke portion 14, ball-bearing raceways 27 and 28 are placed in the enlarged portion 15 of the tubular spoke. The reason for the projecting part 16 of the inner tubular spoke portion is to prevent the contact of the pneumatic cushion and the outer spoke portion 20 of the telescopic spoke, which if it existed, would rapidly wear out the pneumatic cushion by constant rubbing during the motion.

It will be easily seen that the structure of the wheel is such that the elements on which resiliency depends are not in contact with the road, and therefore, subjected to little wear. It is also apparent that because of the peculiar construction of the wheel, the parts will not become deranged from rounding corners or in side thrusts when traveling over the road. It may be also noted that the particular size of the wheel will depend upon the vehicle with which it is used, and the strength of the various parts will also depend upon such fact. It may be also added that the resiliency of the wheel, due to the part 19 telescoping in the tubular spoke 14, is air cushioned in said tubular member, and consequently adds to the resiliency and flexibility of the wheel.

When a pneumatic chamber is injured and to be replaced, the two rim sections 25 are removed, without the aid of a jack or similar apparatus, but by means of bolts in the collars 26, from the part 20 of the telescopic spoke and slid toward the outer felly 21, therefore permitting the extraction of the injured chamber and the substitution of a new one. Then the sections may be replaced, as can be easily seen, to the original position.

Having thus described my invention, I claim as new and desire to secure by Letters Patent:

1. A vehicle wheel comprising a hub; a rim; spokes made of telescoping parts connecting the hub with the rim; a circular element carried by the spoke parts secured to the hub; abutting segments carried by each of the spoke parts secured to the rim; and a plurality of pneumatic elements intermediate said circular element and said abutting elements, substantially as and for the purpose set forth.

2. A vehicle wheel comprising a number of spokes, each spoke being made up of inner and outer spoke portions in telescope relation, the outer spoke portions comprising members in pivotal relation with each other, one of said members being adapted to move about the pivot relatively to the other member; a circular member associated with all of the inner spoke portions; an abutting segment associated with each of the outer spoke portions, said segments forming a series of recesses; and a pneumatic cushion in each of said recesses and in contact with said circular member.

3. A vehicle wheel comprising a number of spokes, each spoke comprising a plurality of parts and being telescopic in character, the outer one of the said parts being adapted to move longitudinally to the inner one of the said parts, the outer part comprising a number of members in pivotal relation, whereby one of the outer parts may also partake of a pendulum movement, a member associated with all of said other parts, a segment associated with each of said outer parts, said segments and said member forming a series of pockets, and a pneumatic cushion for each of said pockets.

4. A vehicle wheel comprising a number of telescoping spokes, each spoke comprising a casing and an outer member movable longitudinally of the casing, a portion of the casing being enlarged, the inner member being made up of parts in pivotal relation, one of the said parts being adapted to move within the said enlarged portion, there being a number of balls within the casing adapted for engagement with the said moving member, means carried by said casings and said outer members forming a series of pockets, and independent cushioning means in said pockets.

5. A vehicle wheel having a hub and an outer felly, an inner U-shaped felly intermediate said hub and outer felly, a plurality of alternate solid and tubular spokes connecting said inner felly and hub, said tubular members having enlarged parts, a plurality of spokes connected to said outer felly and telescoped in said tubular spokes, raceways provided in said enlarged portions of said tubular spokes for said telescoping spokes, a section intermediate said U-shaped inner felly and said outer felly and attached to each of said telescoping spokes, pockets formed by said U-shaped rim and said sections and the enlarged parts of the tubular spokes, and independent resilient members positioned in said pockets.

6. A vehicle wheel comprising a number of telescoping spokes, each spoke comprising a casing and an outer member movable longitudinally of the casing, a portion of the casing being enlarged and having the form of an ellipse in cross section, elliptically disposed ball raceways positioned in said casing, the outer member being made up of parts in pivotal relation, one of said parts being adapted to move within said enlarged portion in the path of the longitudinal axis of the ellipse and adapted to contact with said elliptically disposed ball raceways when moving in said axis of the ellipse, means carried by said casing and said outer member forming a series of pockets, and independent cushioning means in said pockets.

7. A vehicle wheel comprising a hub; a rim; spokes made of telescoping parts connecting the hub with the rim; a circular element carried by the spoke part secured to the hub; an abutting segment carried by each of the spoke parts secured to the rim, each of said abutting segments forming a recess; independent pneumatic elements engaging said recesses and said circular element, each of the abutting segments being adapted to co-act with a pair of adjacent pneumatic elements.

In testimony whereof, I have signed my name to this specification in the presence of two subscribing witnesses.

ELMER ZIMMERMAN CROW.

Witnesses:
  C. M. WILLIAMSON,
  JOHN D. MCGILL.

---

Copies of this patent may be obtained for five cents each, by addressing the "Commissioner of Patents, Washington, D. C."